Aug. 5, 1969 W. E. LERWILL ET AL 3,459,929
METHODS OF AND APPARATUS FOR THE CORRELATION OF VARIABLES
Filed April 21, 1965 3 Sheets-Sheet 1

INVENTORS
WILLIAM EDWARD LERWILL
NIGEL ALLISTER ANSTEY
BY
Mason, Kolehmainen, Rathburn & Wyss
ATTORNEYS Aug. 5, 1969  W. E. LERWILL ETAL  3,459,929
METHODS OF AND APPARATUS FOR THE CORRELATION OF VARIABLES
Filed April 21, 1965  3 Sheets-Sheet 2
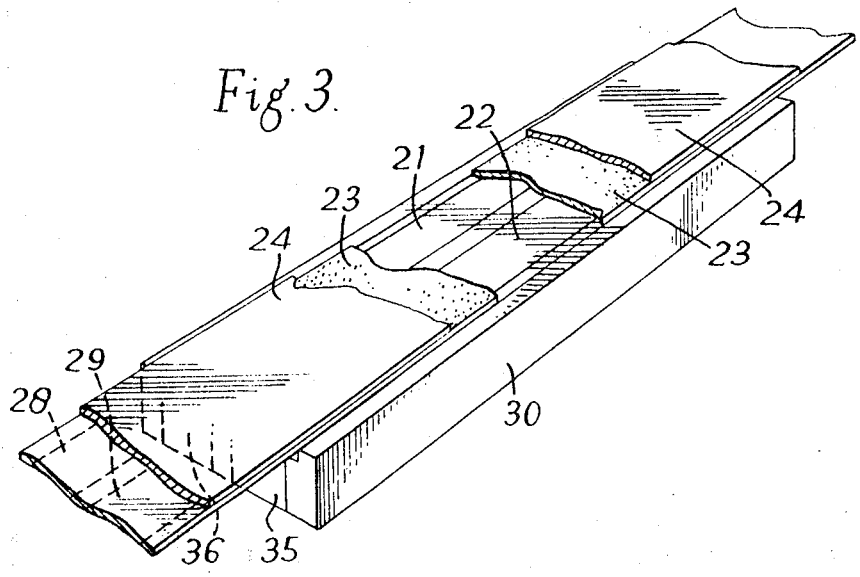
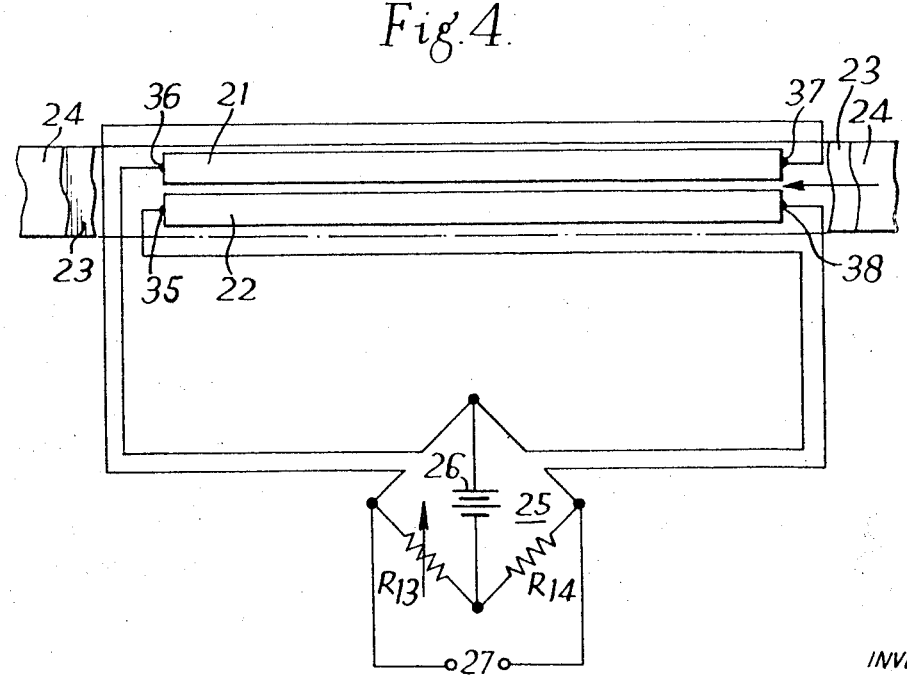
INVENTORS
WILLIAM EDWARD LERWILL
NIGEL ALLISTER ANSTEY
BY
Mason, Kolehmainen, Rathburn & Wyss
ATTORNEYS Aug. 5, 1969  W. E. LERWILL ETAL  3,459,929
METHODS OF AND APPARATUS FOR THE CORRELATION OF VARIABLES
Filed April 21, 1965  3 Sheets-Sheet 3
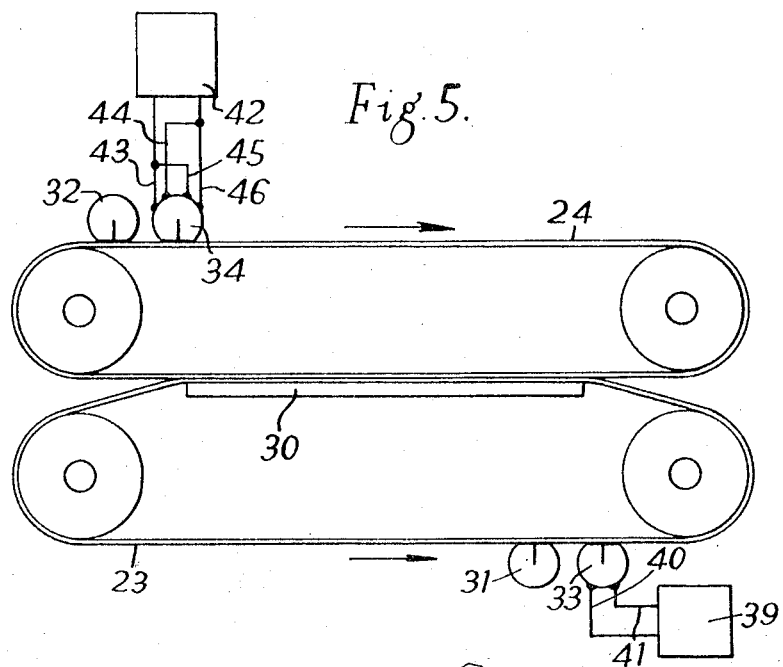
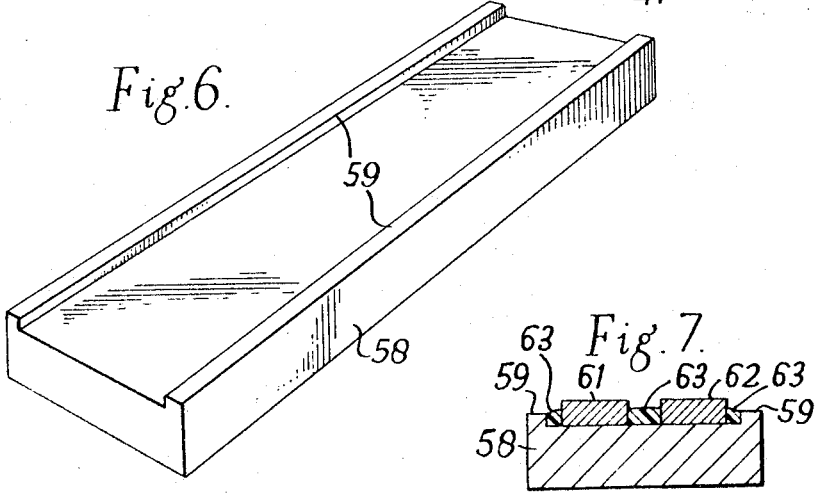
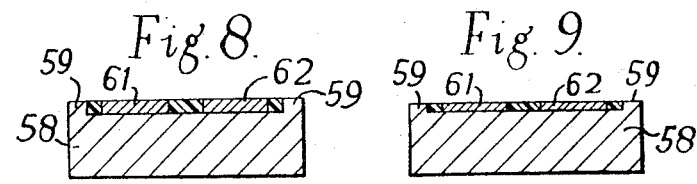
INVENTORS
WILLIAM EDWARD LERWILL
NIGEL ALLISTER ANSTEY
BY
Mason, Kolehmainen, Rathburn & Wyss
ATTORNEYS

United States Patent Office 3,459,929
Patented Aug. 5, 1969

3,459,929
METHODS OF AND APPARATUS FOR THE CORRELATION OF VARIABLES
William Edward Lerwill, Keston, Kent, and Nigel Allister Anstey, Orpington, Kent, England, assignors to Seismograph Service Corporation, Tulsa, Okla.
Filed Apr. 21, 1965, Ser. No. 449,789
Claims priority, application Great Britain, Apr. 24, 1964, 17,061/64
Int. Cl. G06f *15/34;* G06g *7/19*
U.S. Cl. 235—181                    9 Claims

ABSTRACT OF THE DISCLOSURE

A method and apparatus for correlating two variables by recording each of the variables longitudinally along an elongated recording medium such as a magnetic tape. The two tapes are then moved so that energy fields created by the recording act upon a correlating head having a property, such as its electrical resistance, directly affected by the energy fields. The changes in the property of the correlating head as one of the recording media is moved relative to the other and past the head are used to produce an output signal representing the correlation between the two energy fields as a function of delay between the two variables.

---

This invention relates to methods of and apparatus for correlating two variables.

In the following description reference will be made to correlation, cross-correlation and auto-correlation.

The term "correlation" is a general term which refers to an assessment of the relationship between two quantities.

The term "cross-correlation" refers to a specific form of correlation which includes the steps of:

(i) Multiplying the ordinates of one time-variant quantity $g(t)$ by those of another time-variant quantity $r(t)$, (ii) Integrating the products over a finite period of time T, and (iii) Repeating these two operations for a range of values of the time shift $\tau$ between the origins of the two variables $r(t)$ and $g(t)$.

The finite cross correlation function $\phi_{gr}(\tau)$ is given by $$\phi_{gr}(\tau) = \frac{1}{T}\int_0^T g(t).r(t+\tau).dt \tag{1}$$

The term "auto-correlation" refers to the cross-correlation of quantities having two identical patterns that is when $g(t) = r(t)$.

Formula 1 then becomes $$\phi_{gg}(\tau) = \frac{1}{T}\int_0^T g(t).g(t+\tau).dt \tag{2}$$

$\phi_{gg}(\tau)$ is known as the auto-correlation function.

In recent years correlation techniques have become very useful in many branches of science and technology, and various methods of effecting cross-correlation have been introduced. Several novel correlating devices, and some of their applications in science and technology, are described in the specifications of United States patent applications Ser. Nos. 190,912, now abandoned, and 277,211, now Patent No. 3,371,196.

For example, the specification of our abandoned United States application Ser. No. 190,912 shows that correlation can be carried out by simulating one of the quantities to be correlated by means of a plurality of detecting elements which are distributed in space along a path traversed by an energy field representing the other quantity to be correlated, so that the distribution in space of the detecting elements with respect to the travelling energy field corresponds with the first one of the quantities.

The same specification describes several methods of doing this. A typical method involves an extended magnetic recording or play-back head whose configuration is an analogue of the first of the variables to be correlated; the other variable is then either recorded on a magnetic medium which is passed over the head (in which case an output representing the cross-correlation function is obtained from the head) or is supplied to the head (in which case a recording representing the cross-correlation function is obtained on a magnetic medium passed over the head).

The methods of this said application No. 190,912 however, in spite of their great advantages, suffer from the limitation that it is necessary to have previous knowledge of one of the variables which are to be correlated, since this knowledge is used in the design of part of the apparatus. In many cases this is not important and does not introduce disadvantages. For example, in seismic exploration the correlator can generally be pre-programmed without trouble because this is rendered desirable owing to other requirements (such as the use of synchronized vibrators and the compositing of signals) which already require that a known control signal should be used.

There are, however, very many cases in which precise information of one of the variables to be correlated is not available in time and in a way such that it can be used in the design of the correlator. It is, therefore, a great advantage to provide a method of and means for correlating two variables which does not require that one of the variables be known in advance.

One method of achieving this using the Hall effect, together with apparatus for carrying it out, forms the subject of our United States application No. 396,763.

It is the principal object of the present invention to provide a novel and improved correlation method and apparatus, utilising the magnetoresistive effect. This is the effect by which the resistance of an electrical conductor, measured in a certain direction, is affected by the application of a magnetic field which is perpendicular to that direction.

The invention is particularly, although not exclusively, concerned with the provision of novel correlating heads which utilizes this magnetoresistive effect, whilst it is also concerned with the production of such heads and with the ways in which they are used.

It is also possible to provide and use correlating heads in which the resistance is varied by energy fields other than magnetic.

The manner in which the magnetoresistive effect may be used for correlation, as well as other features of the present invention will now be described with reference to the accompanying drawings.

In these drawings:

FIGURE 3 is a broken-away view showing part of a twin magnetoresistive correlating head;

FIGURE 4 illustrates typical electrical connections for such a twin magnetoresistive correlating head;

FIGURE 5 illustrates electrical connections to recording heads used with the correlating head of FIGURE 4;

FIGURES 6 to 9 illustrate successive stakes in the manufacture of a magnetoresistive correlating head, FIGURE 6 being a general view showing a ceramic block used for the head and FIGURES 7 and 9 being sectional views showing stages in the construction of the head.

Figure 1:
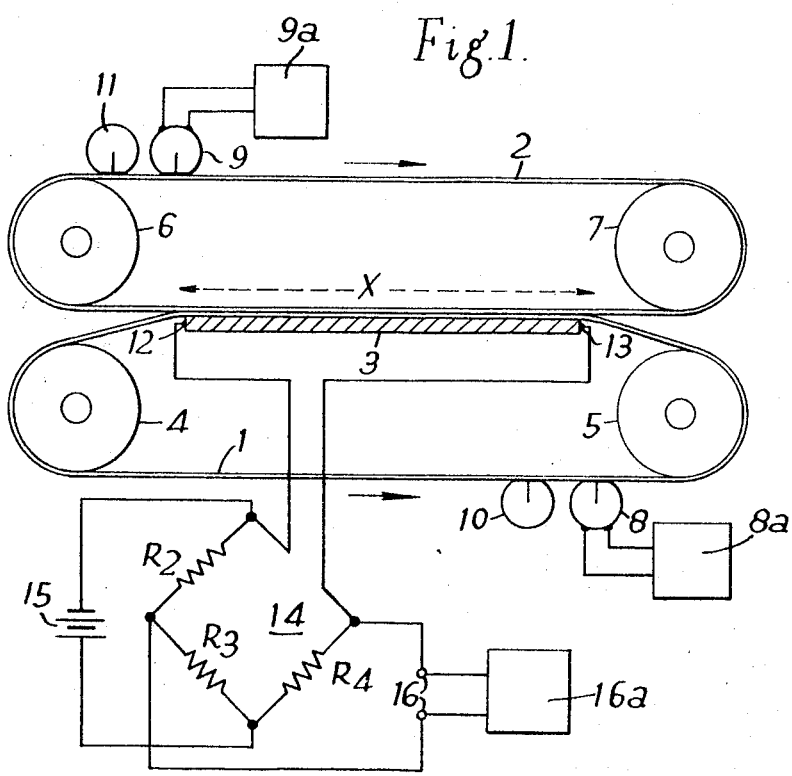
FIGURE 1 is a diagrammatic representation of a preferred form of a basic correlating apparatus exemplifying the invention.

In the apparatus of FIGURE 1, two endless loops 1 and 2, formed of magnetic tape, are caused to pass over a novel magnetoresistive correlating head shown generally at 3. The loops pass over two pairs of rollers 4, 5 and 6, 7. The drive to the tape may be imparted through these rollers or through conventional capstan arrangements. The tape speeds of the two loops are normally identical.

The lower loop 1 is fitted with fast-acting brakes and clamps (not shown) by which the motion of the tape may be arrested at will; the upper loop 2 normally cycles continuously. The reference signal $g(t)$ is recorded on the tape loop 1 by a recording head 8 which is connected to an amplifier unit 8a the other signal $r(t)$ is recorded on the tape loop 2 by a recording head 9, which is supplied through an amplifier 9a. Erase heads 10 and 11 may be used to clean the tapes before recording. Auxiliary conventional playback heads (not shown) may be used to monitor the recording process.

The tape loops 1 and 2 are normally used with their oxide surfaces outwards, so that where they pass over the head 3 the two oxide surfaces are in contact. Means (not shown) may be provided for ensuring that the two tapes are held in contact with each other, and that the lower tape is in contact with the head 3 along the entire length of the latter.

Figure 2:
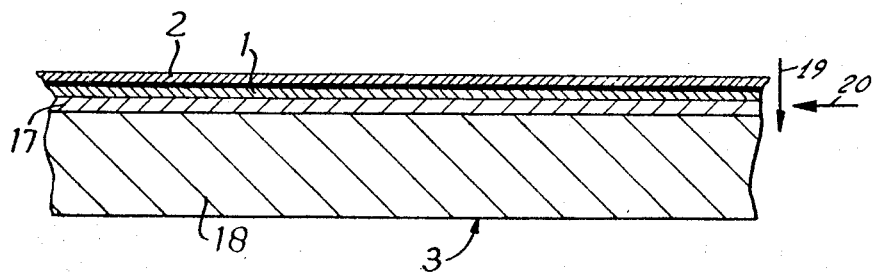
FIGURE 2 is a sectional view through part of a typical magnetoresistive correlating head constructed in accordance with the invention.

FIGURE 2 illustrates a section along the length (only part is shown) of the magnetoresisitive head 3. The tape loops 1 and 2 are shown as passing over the head, which they do with the oxide surfaces in contact. The head itself comprises an extended wafer-thin strip 17 of a magnetoresistive material (such as indium antimonide) which is bonded to a block 18 of a material (such as a magnetic ceramic) having high permeability and high resistivity. The width of the magnetoresistive strip 17 is normally comparable to that of the magnetic track which acts on it.

A constant or near-constant electric current is passed along the length of the magnetoresistive strip through electrical connections which are shown generally at 12 and 13 in FIGURE 1 and produces a current flow parallel to an arrow 20 shown in FIG. 2; this current translates any changes in the resistive of the magnetoresistive strip into voltage variations which may be amplified and detected by conventional means. One arrangement is illustrated by the bridge 14 of FIGURE 1, which includes resistances $R_2$, $R_3$ and $R_4$. The resistance $R_4$ is larger than the resistance of the magnetoresistive strip 17. The energising current for the bridge 14 is provided by a battery 15, whilst an output voltage is obtained at terminals 16, which are connected to a suitable amplifier 16a.

The manner of operation of the magnetoresistive head is as follows. Assume that a reference signal has been recorded on the tape loop 1 by the recording head 8. The recording process will have converted the signal into a variation of perpendicular magnetic induction as a function of distance $x$ along the tape; this function may be denoted by $g(x)$. Assume that the tape with the signal is brought into position over the head 3, and stopped. Assume that a second signal has been recorded on the loop 2 by the recording head 9, and that this signal then passes over the reference signal as the latter lies over the head 3. The recording process will then have converted this second signal into a variation of perpendicular magnetic induction as a function of distance along the tape, and the continued motion of the loop 2 means that this variation may be denoted (with reference to a stationary origin) as $r(x+\xi)$, where the shift $\xi$ changes steadily as the loop 2 passes over the stationary loop 1 and the head 3.

Provided that the recorded wavelengths are long relative to the thicknesses of the tapes 1 and 2 and of the magnetoresistive strip 17, and provided that the permeability of the block 18 is sufficiently high, the magnetic induction permeating an element of the strip 17 perpendicular to its plane (parallel to an arrow 19 in FIG. 2) approximates well to the algebraic sum of the perpendicular magentic inductions of the two tapes over the element. The total magnetic induction $B_1$ through any such element is thus $$B_1 = g(x) + r(x+\xi)$$

Over the range of inductions available with current magentic tapes, the fractional changes $\Delta R/R$ in the resistance $R$ of a magnetoresistive material is related to the square of the magnetic induction by the coefficient of magnetoresistance M. Consequently the fractional change in the resistance of the element to a current flowing along the length of the magnetoresistive strip 17 in the dircetion of the arrow 20 (FIG. 2) is $$\frac{\Delta R}{R} = M[B_1(x)]^2$$

$$= M[(g(x))^2 + (r(x+\xi))^2 + 2g(x)r(x+\xi)]$$

The fractional change of resistance between the ends 12 and 13 of the entire strip, having length X, is therefore $$\frac{\Delta R}{R} = M\int_0^X (g(x))^2 dx + M\int_0^X (r(x+\xi))^2 dx$$

$$+ 2M\int_0^X g(x) \cdot r(x+\xi)$$

In the arrangement of FIGURE 1, a voltage proportional to this change of resistance appears across the terminals 16. This voltage has three components, corresponding to the three terms of the above expression. The first term is proportional to the energy in the first signal within the integration internal X; this yields a constant unidirectional voltage. The second term is proportional to the energy in the second signal, within the integration interval X; this yields a unidirectional voltage on which is superposed a "ripple" representing the difrence in the part of the signal just entering the integration interval and that just leaving it. The third term is proportional to the desired cross-correlation function.

In all cases where the cross-correlation function is an oscillating function of zero mean, the unidirectional components of the first two terms may be removed merely by A.C. coupling in an amplifier 16a which accepts the output from terminals 16. There then remains, superposed on the cross-correlation function, the above-mentioned "ripple" term. The magnitude of this term depends on the number of cycles of the second signal contained within the integration interval; for all signals appropriate to correlation techniques this magnitude is small, and so the ripple term may often be neglected.

FIGURES 3, 4 and 5 illustrate a modification which removes the unidirectional and ripple terms altogether. This involves a side-by-side arrangement of two magnetoresistive strips 21 and 22 with two corresponding magnetic tracks 28 and 29 on each of the tape loops 23 and 24, which correspond to the loops 1 and 2, respectively. The two magnetoresistive strips 21 and 22 may still be mounted on a single support block, here shown at 30, which corresponds to the block 18. The arrangements for driving the tape loops remain as before, except that wider tape is necessary.

Erase heads 31 and 32 corresponding to the heads 10 and 11 may cover the full widths of the tapes, as may one of the recording heads, (e.g. the one shown at 33 in FIGURE 5) which corresponds to one of the heads 8 and 9 of FIGURE 1. The other recording head 34, however, is a twin-track head which is arranged to record the two spaced tracks (indicated at 28 and 29 in FIGURE 3) over the two magnetoresistive strips 21 and 22. The connections to the ends of these strips are shown at 35, 36, 37 and 38.

One of the two signals to be correlated is applied to the full-width recording head 33 from an amplifier 39

(FIGURE 5) through a pair of connections 40 and 41 in the normal way, whilst the other signal is applied from an amplifier 42 to one track of the twin-track recording head 34 with normal polarity (through connections 43 and 44) and to the second track of the twin-track recording head 34 with opposite polarity (through connections 45 and 46). In this way one magnetoresistive strip is affected by the sum of the magnetic inductions produced by the two signals, while the other magnetoresistive strip is affected by their difference.

The two magnetoresistive strips 21 and 22 are arranged in a differential network, such as the bridge 25 (FIGURE 4). This includes constant current resistances $R_{13}$ and $R_{14}$, which are connected to a battery or other supply 26. By this means the voltage appearing at the output terminals 27 of the bridge, which are connected to an amplifier 27a, may be made to represent the difference between the voltages across the two strips.

Provided that the resistances, magnetoresistive coefficients and temperatures of the two strips 21 and 22 are equal, and provided that equal currents flow through them, consideration of the identity $(a+b)^2 - (a-b)^2 = 4ab$ shows that the voltage appearing at the terminals 27 represent the cross-correlation function along; the energy and ripple terms from the single-strip analysis are cancelled.

In fact, this voltage output is given by $$4iRM \int_0^X g(x) \cdot r(x+\xi) dx$$

where $i$ is the current flowing through each strip and $R$ is the resistance of each strip. Consequently this embodiment of the present invention produces an output proportional to the true cross-correlation function of the two variables represented by the perpendicular magnetic inductions on the two tapes.

Many of the individual parts of the apparatus employed in this correlator may be of conventional construction. Thus the means for driving the tape loops, and the rollers, tape guides, erase heads, recording heads and amplifiers may all be of standard types. The magnetoresistive correlating heads, however, are entirely novel, and the method of their manufacture represents an important feature of the invention.

Such correlating heads can normally be made, for convenience, in sections about 10 cm. in length. A block 58 corresponding to such a section is illustrated in FIGURE 6, where the width of the block may typically be 2 cm. and the thickness 1 cm. The thickness of the block is accurately controlled, as are the parallelism and flatness of its upper and lower faces. The upper face is machined to include two lands 59 which are typically 0.13 mm. higher than the upper face of the block. The material is a high-permeability, high-resistivity magnetic ceramic; material marketed under the tradename "Mullard Ferroxcube B" has been found to be suitable. Electrical connecting strips, typically of thin brass or copper such as those indicated at 35 and 36 in FIGURE 3, are cemented to the block 58 with an epoxy resin.

The magnetoresistive material used should have a high coefficient of magnetoresistance, and be otherwise suitable in its physical properties. A preferred material is indium antimonide. The magnetoresistive strips may be formed from an ingot of this material, some 10 cm. in length, by the following procedure:

(1) A slice may be cut through the ingot, having a thickness equal to the desired width of the magneto-resistive strips. A suitable figure for this width is 4 mm.

(2) Strips may then be cut from this slice, the strips typically having dimensions 10 cm. in length, 4 mm. in width and 0.5 mm. in thickness.

(3) One face of each strip is then lapped flat, and this face is then cemented to the block 58, with the strips in the positions shown at 61 and 62 in FIGURE 7. An epoxy resin is suitable for the cementing, provided that care is taken to minimise the thickness of cement between the strip and the block. The spaces between the two strips, and between the strips and the lands 59, are then filled with an epoxy resin, as shown at 63, to provide support for the sides of the strips.

(4) The upper faces of the strips 61 and 62 are then lapped on a rotary lapping machine, using a very fine grit, until these faces are coplanar with the lands 59 (FIGURE 8). The resistance to lapping offered by the ceramic is much greater than that of the semiconductor, so that the lands have the effect of ensuring that the initial lapping does not taper the thickness of the magnetoresistive strips 61 and 62.

(5) The lapping process then proceeds more slowly, until the strip thickness is of the order of 0.1 mm. (FIGURE 9). The final lapping is controlled on the basis of equality of the resistance of all strips, but must simultaneously satisfy the requirement of parallelism between the upper and lower faces of the strips; this last point may be checked by measurement from the lower face of the ceramic block 58.

(6) Electrical continuity between the connection strips (shown at 35 and 36 in FIGURE 3) and the semiconductor strips is ensured by the use of local indium plating or indium solder.

An extended correlating head may then be formed by placing a plurality of these 10 cm. sections in a suitably machined tray or holder, so that they form one long head, and by ensuring electrical contact between the connection strips by pressure or other means. Wires may be brought out from these interconnections to form taps along the correlating head; these are useful for some applications.

The upper limit of the frequency response of such a correlator is defined by the recording tape speed, by the thickness of tape and magnetoresistive strip, and by the constancy of the tape drive. Typical machines can be provided with a variety of tape speeds, the accuracy and constancy of which are ensured by a servo drive system and by extreme mechanical precision. The drive system may be based, for example, on that published by Miller and Buckley in Electronic Technology, February 1961, p. 63.

The lower limit of the frequency response depends on the method employed for recording on the magnetic tapes. For example, if conventional longitudinal magnetic recording is used, the perpendicular component of magnetic induction out of the tape is not proportional to the recording current itself but to its first derivative. As shown above, the output of the correlator is proportional to the cross-correlation function of the two signals represented by the perpendicular induction, so that with longitudinal magnetic recording the output is proportional to the cross-correlation of the first derivatives of the two inputs. Since the overall action of the twin-track magnetoresistive correlator is linear, the cross-correlation of the input signals themselves, rather than of their derivatives, may be obtained either by passing each signal through a simple integrating network before it is recorded on the tape, or by passing the output through two such integrating networks included in the output amplifier. Then the break points of these integrators define the low-frequency cut-off of the correlator.

In the particular case of longitudinal recording, the arrangement of the integrating equalisers may be varied for different applications. Thus if the correlator is to be used for the detection of sinusoidal or narrow-band signals immersed in noise, the equalisation may not be necessary and in fact the best signal-to-system-noise ratio may be obtained without it. For other applications there is a choice between the provision of the equalisation in the output amplifier or in the input recording amplifiers. The best signal-to-system-noise ratio is obtained with the equalisation in the output amplifier, and this arrangement is often used. However, for some purposes there is an advantage in applying the equalisation in the recording amplifiers.

One such usage springs from the fact that the amplitude and form of the output from the magnetoresistive head do not depend on the speed of the moving tape; thus the maximum correlation between signals recorded on the two tapes may be sought by manual movement of the upper tape loop, at very low speed. If this is done it is essential that the output amplifier has response to very low (or zero) frequency. Simple electrical integrators are not feasible at such frequencies, and so the integration is best performed at signal frequencies during the recording process.

A second example where the integration is best provided in the record amplifiers is concerned with the use of the correlator for making a measurement of the energy of a waveform. According to the equations given earlier, the change in resistance of a single magnetoresistive strip produced by a single tape is proportional to the energy of the first differential of the signal recorded on the tape and contained within the length of the strip. Thus, if an integrating network having a suitably low break-point is included in a recording amplifier (or if transverse or perpendicular recording is used), a measure of the energy of a recorded signal may be made by causing the recorded tape to lay over the magnetoresistive head and by noting the corresponding change in resistance. This use of a magnetoresistive correlating head for measurement of signal energy constitutes an auxiliary but valuable feature of the present invention.

In FIGURE 1 the recording head 9 is shown retarded, with respect to the recording head 8, by an amount which is at least equal to the length of the magnetoresistive head 3. By this means the correlator can be used to yield a complete two-sided finite auto-correlation function, having a total duration equal to twice the integration interval. Since the auto-correlation function is symmetrical about zero shift, this is often unnecessary and the recording head 9 may be moved along the loop 2 until it and head 8 are at equal distances (measured along the tapes) from the head 3. Some applications, in which the central portion of the auto-correlation function is of most interest, are best served by mounting the recording head 9 at a position a little further distant from the head 3 than is the recording head 8.

Some cross-correlation operations are best done with the recording heads 8 and 9 at equal distances from the head 3. Others, such as those employed for direction-finding using continuous signals observed at two spaced points, require that the recording heads are at equal distances but that there should be superposed on the linear motion of the upper loop 2 a reciprocating motion, whose stroke corresponds to the maximum possible delay between common components of the two input signals; this reciprocating motion may be obtained by using ganged eccentric rollers at positions 6 and 7, or by other means.

In FIGURES 1 and 4 the bridges 14 and 25 are shown energised by batteries 15 and 26. Amplifier drift problems and hum problems are minimised if an A.C. source of suitably high frequency is used for the energisation; the final output is then obtained by rectification and smoothing of the output from the bridge, in a manner well known in the art. Whether D.C. or A.C. energisation is used, it is important that the source be stable and free of noise.

The constant-current resistors $R_{13}$ and $R_{14}$ of FIGURE 4 may be replaced by other well-known constant-current devices if desired, and such constant-current devices may include temperature-sensitive elements to provide a measure of stabilisation against the variations in the properties of the magnetoresistive material with temperature.

In FIGURES 1 and 2 the oxide faces of the two tape loops are shown in contact over the magnetoresistive head. Although this is the usual arrangement, yielding the best approximation to the theoretically desirable conditions, the invention is not limited to this, and one or both of the tape loops may be turned inside-out. Additional features may be provided to ensure smooth motion of the tapes; these include lubrication of the tapes (for example, with a graphite compound) and antistatic provisions (such as a radioactive brush).

With permissible recording levels, with a magnetoresistive head having a length of 50 cm. and other dimensions as quoted hereinbefore, and with an energising current of 100 ma., the output from the correlating head, when auto-correlating a sine wave, is of the order of a few millivolts from a 200 ohm source impedance. Attainable signal-to-system-noise ratios are at least 60 db.

In its facility to provide real-time cross-correlation and auto-correlation, with good dynamic range, the magnetoresistive correlator represents a major advance on the prior art.

The principle of the magnetoresistive correlator is a general one, and correlators and matched filters employing the same principle may be made using forms of energy other than magnetic fields. Basically the requirements are:

(1) An extended transducer, any element of which produces an output proportional to a function, such as the square of the local energisation, and all the elements of which combine to produce a single output or signal which is the integral, over the length of the transducer, of the elemental outputs.

(2) Means for maintaining along the transducer a field pattern whose variation with distance in the direction of the transducer represents one of the variables to be correlated.

(3) Means for transporting along the transducer a second energy field pattern whose variation with distance in the direction of the transducer represents the other of the variables to be correlated, the media supporting the two field patterns being of such a nature and disposed in such a way that each element of the transducer is acted on by a resultant field which is proportional to the algebraic sum of the local fields representing the two variables.

(4) If desired, the provision of two such systems, with a polarity reversal on one variable in one system, and a differential arrangement to cancel the two "energy" terms while reinforcing the cross-correlation term.

It will be understood, of course, that most of the energy for the outputs or signals produced by a transducer may come from an outside source, such as a battery or other source of electrical energy, and does not require to be generated in the transducer itself.

We claim:

1. Apparatus for correlating two variables comprising: first and second elongated magnetic recording tapes; recording means for longitudinally recording said first and second variables respectively on said first and second tapes so as to produce longitudinal magnetic fields on said tapes representative of said first and second variables;
a transducer of extended length comprising a support member formed of magnetic ceramic material having a surface;
at least one strip of magnetoresistive material extending along said surface;
means for moving both of said tapes independently of each other past and directly adjacent said surface;
and means connected to the ends of said strip for producing a signal which varies in accordance with variations in the resistance of said strip.

2. Apparatus according to claim 1, wherein the tapes are superimposed one above the other along the magnetoresistive strip.

3. Apparatus according to claim 2, wherein the magnetic tapes are in the form of endless loops which are arranged to extend along the transducer in close contact with each other and with the magnetoresistive material.

4. Apparatus for correlating two variables comprising:
first and second elongated magnetic recording media;
recording means for longitudinally recording said first and second variables respectively on said first and second media so as to produce longitudinal magnetic fields on said media representative of said first and second variables;
two magnetoresistive transducer members formed of magnetoresistive material;
means for moving both of said media independently of each other past and directly adjacent said transducer members, whereby the magnetic fields which represent the two variables are arranged to pass through both these members with the fields superimposed in each member but with one field reversed in polarity in one of the members as compared with the other member;
and means connected to the ends of said members for producing a signal which varies in accordance with the difference between the resistance of said members.

5. Apparatus according to claim 4, wherein the signals from the two transducer members are fed to a differential circuit to produce an output signal representing a cross-correlation of the two variables.

6. Apparatus for correlating two variables comprising:
first and second elongated magnetic recording media;
recording means for longitudinally recording said first and second variables respectively on said first and second media so as to produce longitudinal magnetic fields in said media representative of said first and second variables;
a transducer of extended length comprising a support formed of a magnetic material;
at least one strip of magnetoresistive material secured to said support;
means for moving both of said media independently of each other past and directly adjacent said strip;
and means electrically connected to the ends of said strip for producing a signal which varies in accordance with variations in the resistance of said strip.

7. Apparatus according to claim 6, wherein said strip is embedded in an electrically insulating material on the support to provide a flush planar surface over which at least one of the magnetic recording media passes in substantial contact with the strip.

8. Apparatus according to claim 6 wherein said transducer includes a pair of similar strips of magnetoresistive material arranged parallel to but insulated from each other.

9. Apparatus according to claim 7, wherein the strip of magnetoresistive material is contained between ribs forming parts of the support, the spaces between the ribs and the strip being filled with an electrically insulating material with the surfaces of the ribs, the strip and the insulating material lying flush with each other.

References Cited

UNITED STATES PATENTS

| 3,100,297 | 8/1963 | Reines | 235—181 X |
| 3,172,032 | 3/1965 | Hunt | 235—194 X |
| 3,199,106 | 8/1965 | Karr | 343—17.2 |
| 3,310,665 | 3/1967 | Schimmel | 235—181 |
| 3,345,504 | 10/1967 | Doty | 235—181 |

MALCOLM A. MORRISON, Primary Examiner

FELIX D. GRUBER, Assistant Examiner

U.S. Cl. X.R.

235—194; 324—77; 340—15, 174